April 8, 1924.  
G. H. QUINN  
COMBINATION NUT LOCK  
Filed Sept. 15, 1922  
1,490,024

Inventor  
G. H. Quinn  
By C A Snow & Co.  
Attorneys.

Patented Apr. 8, 1924.

1,490,024

UNITED STATES PATENT OFFICE.

GEORGE HALLIE QUINN, OF MEMPHIS, TENNESSEE.

COMBINATION NUT LOCK.

Application filed September 15, 1922. Serial No. 588,371.

*To all whom it may concern:*

Be it known that I, GEORGE HALLIE QUINN, a citizen of the United States, residing at Memphis, in the county of Shelby and State of Tennessee, have invented a new and useful Combination Nut Lock, of which the following is a specification.

This invention aims to provide a simple means for holding superposed nuts on a bolt.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
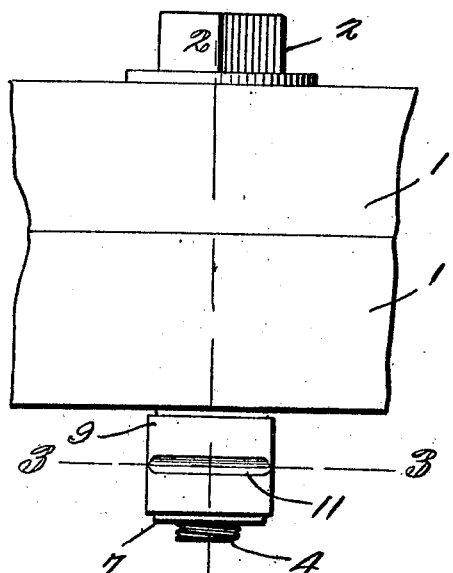
Figure 2:
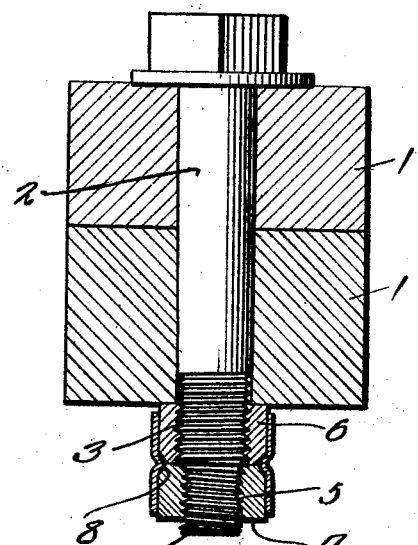
Figure 3:
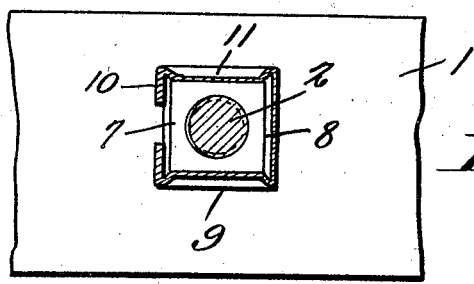
Figure 5:
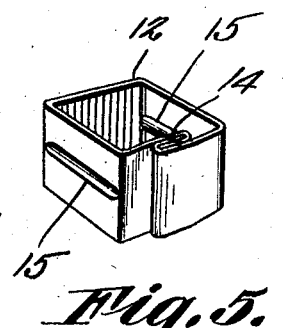
Figure 4:
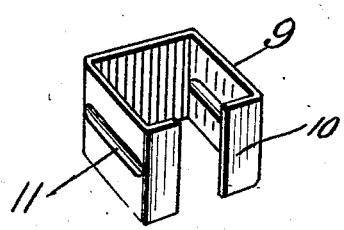

Figure 1 is an elevation; Figure 2 is a section wherein parts appear in elevation, Figure 2 being taken on the line 2—2 of Figure 1; Figure 3 is a section on the line 3—3 of Figure 1; Figure 4 is a perspective showing one collar; Figure 5 is a perspective showing a modified collar.

The numeral 1 denotes two pieces of material held together by a bolt 2 having right hand threads 3 and provided with a reduced tip 4 having left hand threads 5, a nut 6 being engaged with the threads 3, and a nut 7 being engaged with the threads 5, the nuts being in abutment and being provided adjacent to their abutting ends with beveled surfaces defining a circumscribing groove 8.

A spring collar 9 is provided and has spaced fingers 10 which extend toward each other, the collar being bent inwardly to form oppositely disposed ribs 11. When the collar 9 is placed about the nuts 6 and 7, the ribs 11 fit in the circumscribing groove 8, the outer nut 7 being held against rotation, and constituting means for retaining the nut 6. The collar 12 of Figure 5 may be used if desired, the fingers of the collar having hook-shaped flanges 14, adapted to be bent into engagement after the device is about the nuts the ribs being marked by the numeral 15.

The device shown in Figure 4 may be expanded a little and slipped endwise about the nuts. The device shown in Figure 5 may be applied to the nuts in a like way, the hook shaped flanges then being bent into engagement with each other.

What is claimed is:—

In a device of the class described, a bolt having right and left hand threads, nuts on the right and left hand threads and having beveled surfaces defining a circumscribing groove, and a collar made of thin material and distorted on two of its opposite sides to form ribs which stiffen and reinforce said sides, the ribs being received in the groove, another side of the collar being plane to afford resiliency in the collar, the collar having fingers which engage those surfaces of the nuts which are opposite to said plane side of the collar.

In testimony that I claim the foregoing as my own, I have hereto affixed my signature in the presence of two witnesses.

GEORGE HALLIE QUINN.

Witnesses:
ARTHUR DUKE PRUETT,
C. C. COWHERD.